UNITED STATES PATENT OFFICE.

LLOYD RAEBURN BENSON, OF ELLSWORTH, KANSAS.

SOLDERING-STICK.

No. 923,934.              Specification of Letters Patent.         Patented June 8, 1909.

Application filed February 18, 1909. Serial No. 478,692.

*To all whom it may concern:*

Be it known that I, LLOYD RAEBURN BENSON, a citizen of the United States, residing at Ellsworth, in the county of Ellsworth and State of Kansas, have invented a new and useful Soldering-Stick, of which the following is a specification.

This invention relates to soldering fluxes.

The object of the invention is to provide a flux, in stick form, which can be conveniently used for soldering in places where an acid flux, or dissolved dry salt flux would be useless or inconvenient. Furthermore to provide a flux of the character stated, which may be readily manufactured, without the necessity of the employment of special machinery for the purpose, and which will retain its properties, against deterioration, for an indefinite period.

With the above and other objects in view, as will appear as the nature of the invention is better understood, the same consists in the novel soldering flux, hereinafter described and claimed.

In carrying the invention into effect, and in making 100 parts of the completed product, 80 parts by weight of commercial stearin are taken and placed in a granite or copper vessel and subjected to gentle heat until entirely melted, after which 6½ parts by weight of melted rosin and 13½ parts by weight of a soldering solution are added and the mass is then violently stirred for a few moments to prevent separation, and is then immediately poured into molds, and when hardened is ready for use.

The solution referred to is a saturated one, free from muriatic acid, and consists of the following constituents by weight, namely, biborate of soda, 300 parts, chlorid of zinc, 100 parts, and muriate of ammonia 1 part. To determine when this solution is free from muriatic acid, it is brought to the boiling point and is tested with both red and blue litmus papers and if either of the latter shows other than a neutral tint, more biborate of soda is added until the test indicates that all of the acid has been neutralized. The inclusion of the enhanced proportion of the biborate of soda will not detract from the reducing properties of the article, as this is of itself a fair soldering flux. The reason for the addition of so large a proportion of the biborate of soda to the other ingredients is that it has been found practically impossible to drive off all of the muriatic acid and obtain a solution which will stand litmus tests, as the syrup crystallizes just as it reaches the non-acid state; but by the addition of the biborate of soda this is prevented, and brings the solution to a neutral point much quicker.

The above solution is employed when it is desired to secure an absolutely non-acid flux, lest a residue be left on the surface to which the latter is applied and might in time produce corrosion, and this is especially true of indoor electric wire work. For general use, however, it has been found that a solution consisting of biborate of soda ½ part, chlorid of zinc 100 parts, and muriate of ammonia one part, will answer all requirements, and as it will be seen from this that a wide variation in the proportion of the parts of the ingredients may be adopted, it is to be understood that the invention is, not to be limited to either formula given.

The advantages claimed for this compound over other fluxes in stick form are that it is a stronger flux due to the presence of muriate of ammonia and biborate of soda, it is free from muriatic acid, leaves the metals brighter and cleaner than the ordinary fluxes used, causes the solder to flow more freely, and preserves the tinning of the soldering irons.

It may be applied in use by rubbing the end of a stick directly on the parts to be soldered, or by heating the parts and rubbing them lightly with the stick while they are still warm enough to melt the compound.

While it will generally be preferred to include the biborate of soda in the flux, it may, under some conditions, be omitted.

The proportions of the different parts given are those that have been found thoroughly efficient; but it is to be understood that the invention is not to be limited thereto, as conditions might arise when the percentage of each will be varied.

What is claimed is:

1. A soldering flux in solid form containing stearin, rosin, chlorid of zinc, and muriate of ammonia, combined in substantially the proportions specified.

2. A soldering flux in solid form composed of stearin, rosin, chlorid of zinc, muriate of ammonia and biborate of soda, combined in substantially the proportions specified.

3. A soldering flux in solid form consisting of the following ingredients by weight: eighty parts of commercial stearin, six and one-half parts of rosin, and thirteen and one-half parts of a residue of a solution consisting of biborate of soda three hundred parts, chlorid of zinc one hundred parts, and muriate of ammonia one part.

In testimony that I claim the foregoing as my own, I have hereto affixed my signature in the presence of two witnesses.

LLOYD RAEBURN BENSON.

Witnesses:
 IRA E. LLOYD,
 J. M. WILSON.